US012778077B2

(12) United States Patent
Greenwald

(10) Patent No.: US 12,778,077 B2
(45) Date of Patent: Nov. 3, 2026

(54) DISPOSABLE PET FOOD PACK AND METHOD THEREFOR

(71) Applicant: David Greenwald, Jacksonville, FL (US)

(72) Inventor: David Greenwald, Jacksonville, FL (US)

( * ) Notice: Subject to any disclaimer, the term of this patent is extended or adjusted under 35 U.S.C. 154(b) by 12 days.

(21) Appl. No.: 18/819,788

(22) Filed: Aug. 29, 2024

(65) Prior Publication Data

US 2026/0060206 A1 Mar. 5, 2026

(51) Int. Cl.
*A01K 5/01* (2006.01)

(52) U.S. Cl.
CPC .................................. *A01K 5/0121* (2013.01)

(58) Field of Classification Search
CPC .......... A01K 5/01; B65D 81/32; B65D 77/08; B65D 75/00; B65D 21/02; B65D 71/46
USPC ........................................................... 426/72
See application file for complete search history.

(56) References Cited

U.S. PATENT DOCUMENTS

| | | | | |
|---|---|---|---|---|
| 3,662,913 A * | 5/1972 | Mascia | B65D 1/24 | 220/23 |
| 6,398,071 B1 * | 6/2002 | Fellers | B23Q 7/00 | 221/174 |
| 6,568,347 B2 | 5/2003 | Ciguere | | |
| 8,372,457 B2 * | 2/2013 | Delpierre | B65D 81/32 | 426/120 |
| 9,132,951 B2 * | 9/2015 | Parsons | B29D 22/00 | |
| 11,008,152 B2 * | 5/2021 | Lubbe | B65D 81/32 | |
| 11,805,761 B2 | 11/2023 | Bouchard | | |
| 12,171,356 B1 * | 12/2024 | Yoo | B65D 81/24 | |
| 2001/0048955 A1 | 12/2001 | Foreman | | |
| 2003/0026875 A1 | 2/2003 | Aguilar | | |
| 2004/0089583 A1 * | 5/2004 | Coleman | B65D 1/34 | 206/561 |
| 2004/0195120 A1 * | 10/2004 | Anderson | B65D 25/08 | 206/219 |
| 2006/0144340 A1 | 7/2006 | Burge | | |
| 2007/0264395 A1 * | 11/2007 | Adams | B65D 85/00 | 426/110 |
| 2008/0245682 A1 * | 10/2008 | Foulke | B65D 77/00 | 206/216 |
| 2008/0302678 A1 | 12/2008 | Hunwisk | | |
| 2011/0121002 A1 * | 5/2011 | Stiller | B65D 1/24 | 220/504 |
| 2014/0335237 A1 * | 11/2014 | Everingham | B65D 85/00 | |
| 2015/0166240 A1 * | 6/2015 | Foley | B65D 81/34 | |

* cited by examiner

*Primary Examiner* — Joshua J Michener
*Assistant Examiner* — Henry Hooper Mudd

(57) ABSTRACT

A disposable pet food pack includes a first container that is sealed and contains a single serving of wet pet food, a second container that is sealed and contains a single serving of dry pet food, and a connection assembly detachably connecting the first container and the second container. In another embodiment, a disposable pet food pack includes a pet food bowl that includes a lip, a cover detachably connected to the lip, and single-serving pet food packets stored in the pet food bowl under the cover and that include a wet pet food packet and a dry pet food packet.

7 Claims, 10 Drawing Sheets

DISPOSABLE PET FOOD PACK AND METHOD THEREFOR

(b) CROSS-REFERENCE TO RELATED APPLICATIONS

Not Applicable

(c) STATEMENT REGARDING FEDERALLY SPONSORED RESEARCH OR DEVELOPMENT

Not Applicable

(d) THE NAMES OF THE PARTIES TO A JOINT RESEARCH AGREEMENT

Not Applicable

(e) INCORPORATION-BY-REFERENCE OF MATERIAL SUBMITTED ON A COMPACT DISC OR AS A TEXT FILE VIA THE OFFICE ELECTRONIC FILING SYSTEM

Not Applicable (f) STATEMENT REGARDING PRIOR DISCLOSURES BY THE INVENTOR OR JOINT INVENTOR Not Applicable

(g) BACKGROUND OF THE INVENTION

(1) Field of the Invention

The disclosure relates to pet food containers and more particularly pertains to a new disposable pet food pack for providing consumers with a single-serving pack of both wet and dry pet food. It is well known that wet pet food, such as for cats and dogs, is usually sold in single-serving containers, such as cans or plastic containers. In contrast, dry pet food, such as kibble or similar, is usually sold in large bags, which can occupy considerable storage space and can be difficult to handle, especially for persons of lesser strength, such as children, the elderly, or infirm or disabled persons. If a person wishes to mix wet and dry pet food, as is commonly done, the person must measure out a single serving of dry pet food by pouring or scooping the serving out of the bag, whereas the single serving of wet food is easily removed from the disposable container. The present invention provides a disposable single-serving pack that contains both wet and dry food for easy storage and mixing of a single serving for a pet.

(2) Description of Related Art Including Information Disclosed Under 37 CFR 1.97 and 1.98

The prior art relates to pet food containers. The prior art, as best understood, does not disclose a disposable pet food pack that includes a first container that is sealed and contains a single serving of wet pet food, a second container that is sealed and contains a single serving of dry pet food, and a connection assembly detachably connecting the first container and the second container.

(h) BRIEF SUMMARY OF THE INVENTION

An embodiment of the disclosure meets the needs presented above in a disposable pet food pack generally comprising a first container that is sealed and contains a single serving of wet pet food, a second container that is sealed and contains a single serving of dry pet food, and a connection assembly detachably connecting the first container and the second container. In another embodiment, a disposable pet food pack includes a pet food bowl that includes a lip, a cover detachably connected to the lip, and single-serving pet food packets stored in the pet food bowl under the cover and that include a wet pet food packet and a dry pet food packet.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

(i) BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

(j) DETAILED DESCRIPTION OF THE INVENTION

Figure 1:
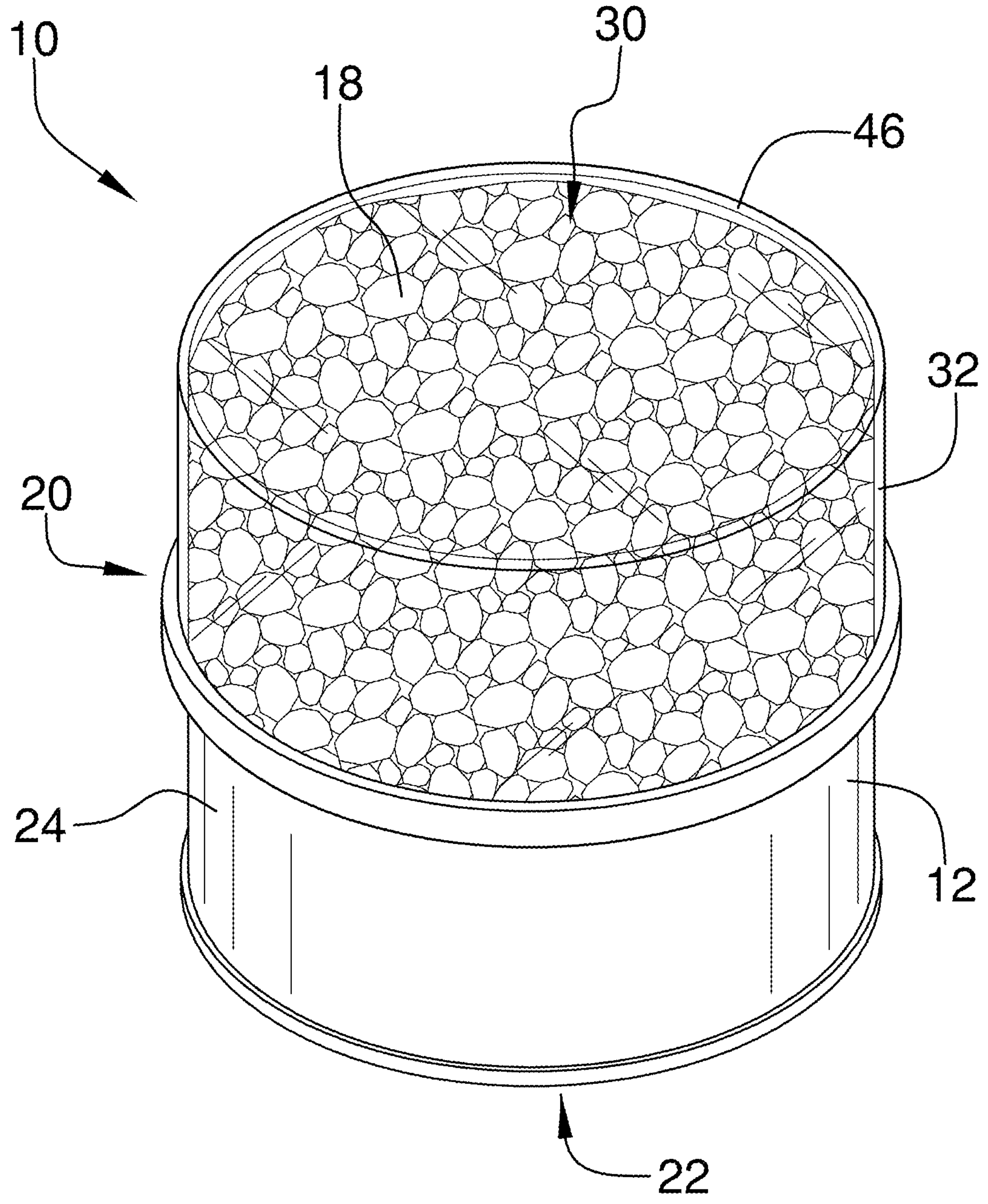
FIG. 1 is a perspective view of a disposable pet food pack according to an embodiment of the disclosure.

With reference now to the drawings, and in particular to FIGS. 1 through 11 thereof, a new disposable pet food pack embodying the principles and concepts of an embodiment of the disclosure and generally designated by the reference numeral 10 will be described.

As illustrated in FIGS. 1 through 7, the disposable pet food pack 10 generally comprises a first container 12 that is sealed and contains a single serving of wet pet food 14, a second container 16 that is sealed and contains a single serving of dry pet food 18, and a connection assembly 20 detachably connecting the first container 12 and the second container 16.

Figure 2:
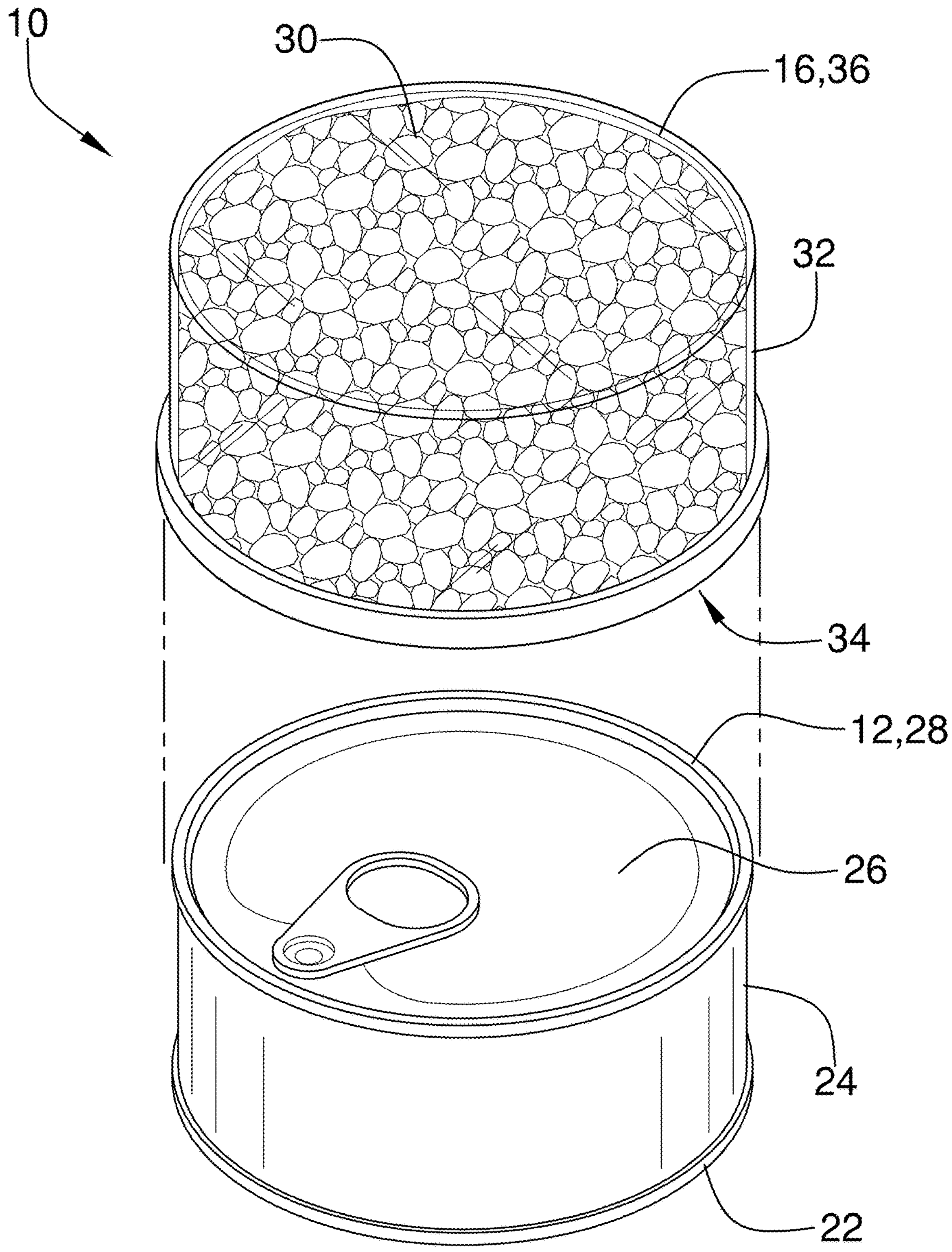
FIG. 2 is an exploded view of an embodiment of the disclosure.
Figure 3:
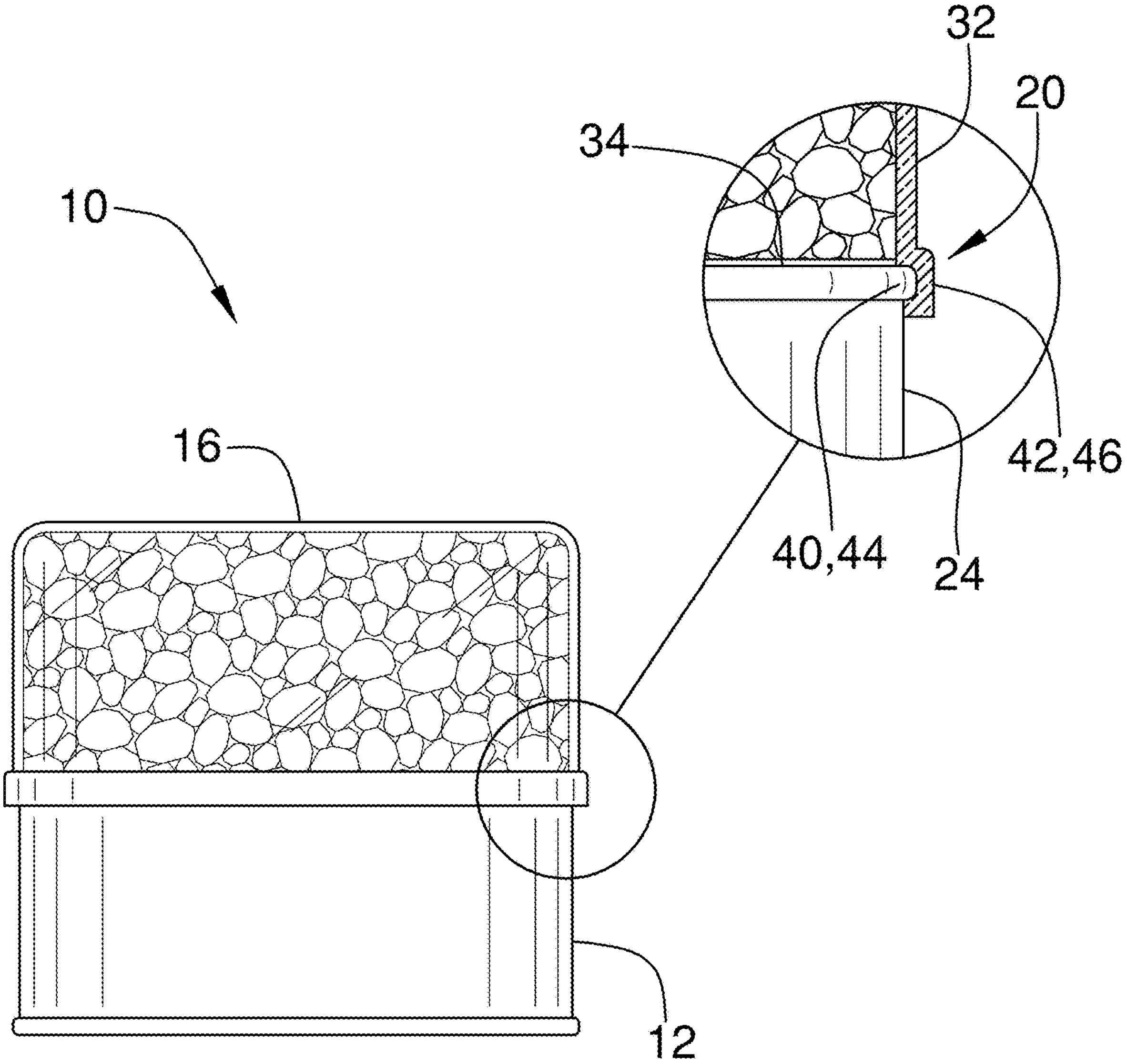
FIG. 3 is a side view of an embodiment of the disclosure.
Figure 4:
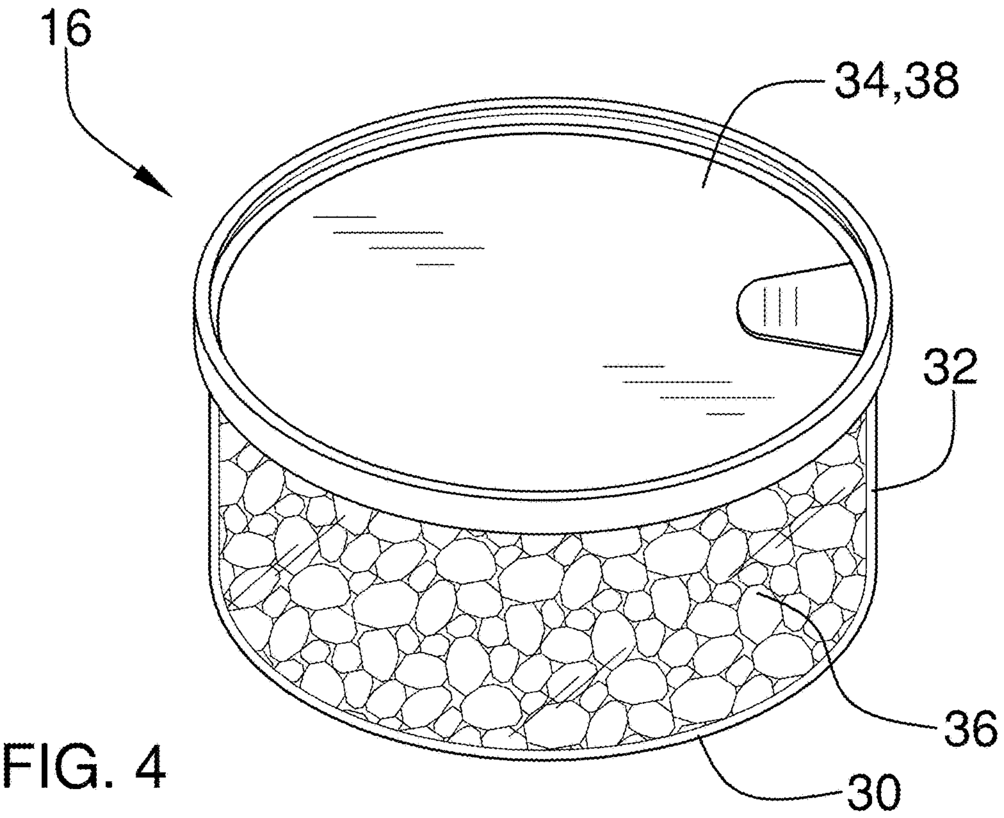
FIG. 4 is a perspective view of a component of an embodiment of the disclosure.

FIGS. 1 through 4 show an exemplary embodiment of a possible design of the disposable pet food pack 10. The first container 12 includes a first bottom 22, a first side wall 24 extending from and transverse to the first bottom 22, and a first cover 26 detachably connected to the first side wall 24. As shown in FIG. 2, the first container 12 can be a traditional wet food container, in this case a can 28 wherein the first cover 26 is a removable lid that possibly includes a pull tab. The can 28 is made of metal, though in another possible embodiment the first container 12 could be plastic and the first cover 26 could be a layer of flexible material, such as plastic or metallic foil, in sealing engagement with the first cover 26. The second container 16 includes a second bottom 30, a second side wall 32 extending from and transverse to the second bottom 30, and a second cover 34 detachably connected to the second side wall 32. As shown in FIGS. 3 and 4, the second container 16 is a plastic tub 36 and the second cover 34 includes a peel-off layer 38. However, a metal container could also be used.

Regardless of the exact design of the first container 12 and the second container 16, they are detachably connected together to form a single commercial unit. As shown in FIG. 3, the connection assembly 20 includes a first connecting portion 40 and a second connecting portion 42, wherein the first connecting portion 40 is a lip 44 positioned on the first side wall 24 and the second connecting portion 42 is a ring 46 projecting from the second side wall 32, wherein the ring 46 engages the lip 44 in a snap-fit manner, as best seen in the close-up cross-sectional view in FIG. 3. The snap-fit connection is only one possible embodiment, as the first container 12 and second container 16 could be connected by adhesive, locking tabs or arms, screw threading, or essentially any detachable connection. The exemplary embodiment shown in FIG. 3 takes advantage of the traditional metal can design of wet food containers, wherein the lip 44 is positioned about the first cover 26 of the first container 12. The ring 46 is positioned about the second cover 34 of the second container 16 such that the first cover 26 faces the second cover 34 when the first container 12 is detachably connected to the second cover 34. While each of the first container 12 and the second container 16 is cylindrical, each could be other shapes, such as squares, rectangles, or ovals.

Figure 5:
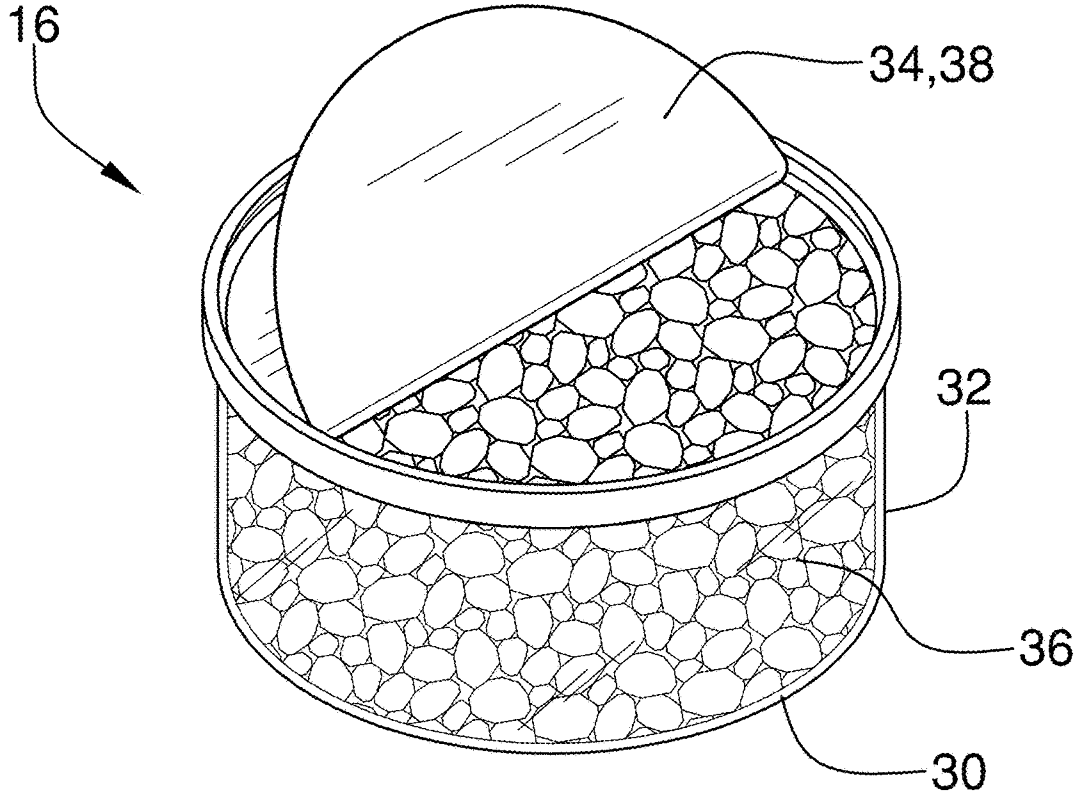
FIG. 5 is a perspective view of a component of an embodiment of the disclosure.
Figure 6:
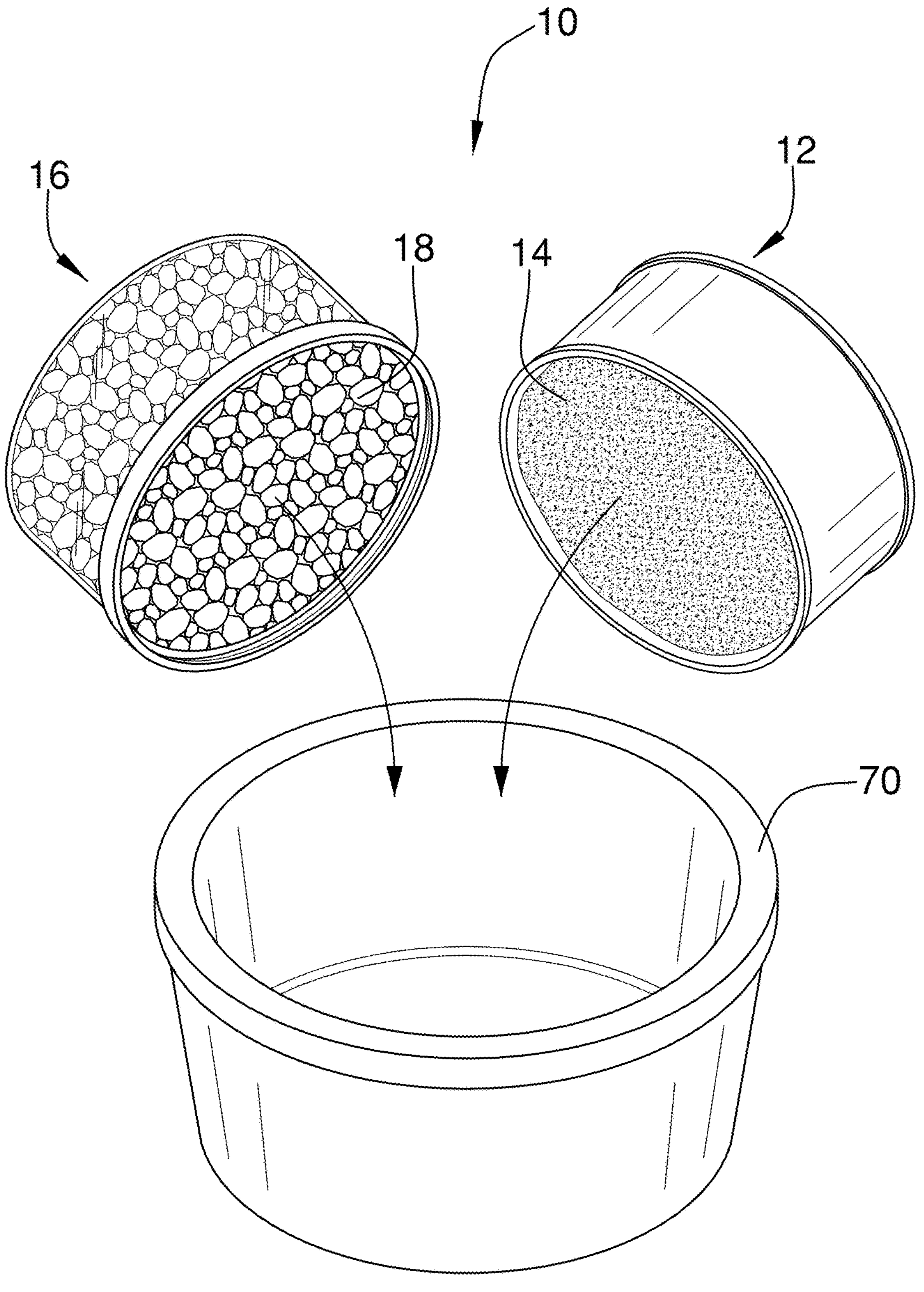
FIG. 6 is a perspective view of an embodiment of the disclosure in use.
Figure 7:
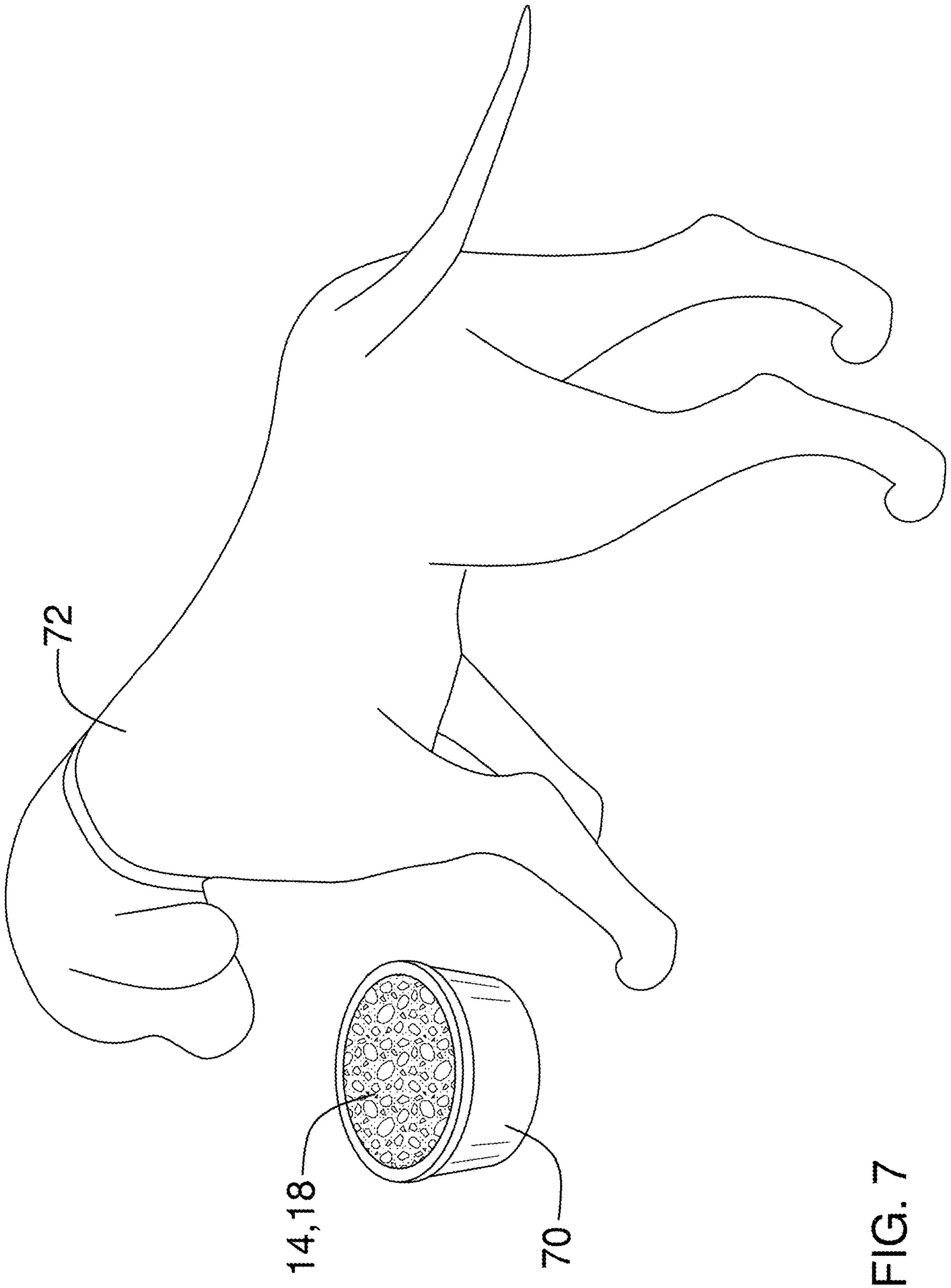
FIG. 7 is a perspective view of an embodiment of the disclosure in use.

FIGS. 5 through 7 show the use of the disposable pet food pack 10. A pet owner opens each of the first container 12 and the second container 16, as shown in FIG. 5. As shown in FIG. 6, the wet food and the dry food are then deposited and mixed in a pet food bowl 70 for consumption by a pet 72, as shown in FIG. 7. The first container 12 and the second container 16 are then thrown out.

Figure 8:
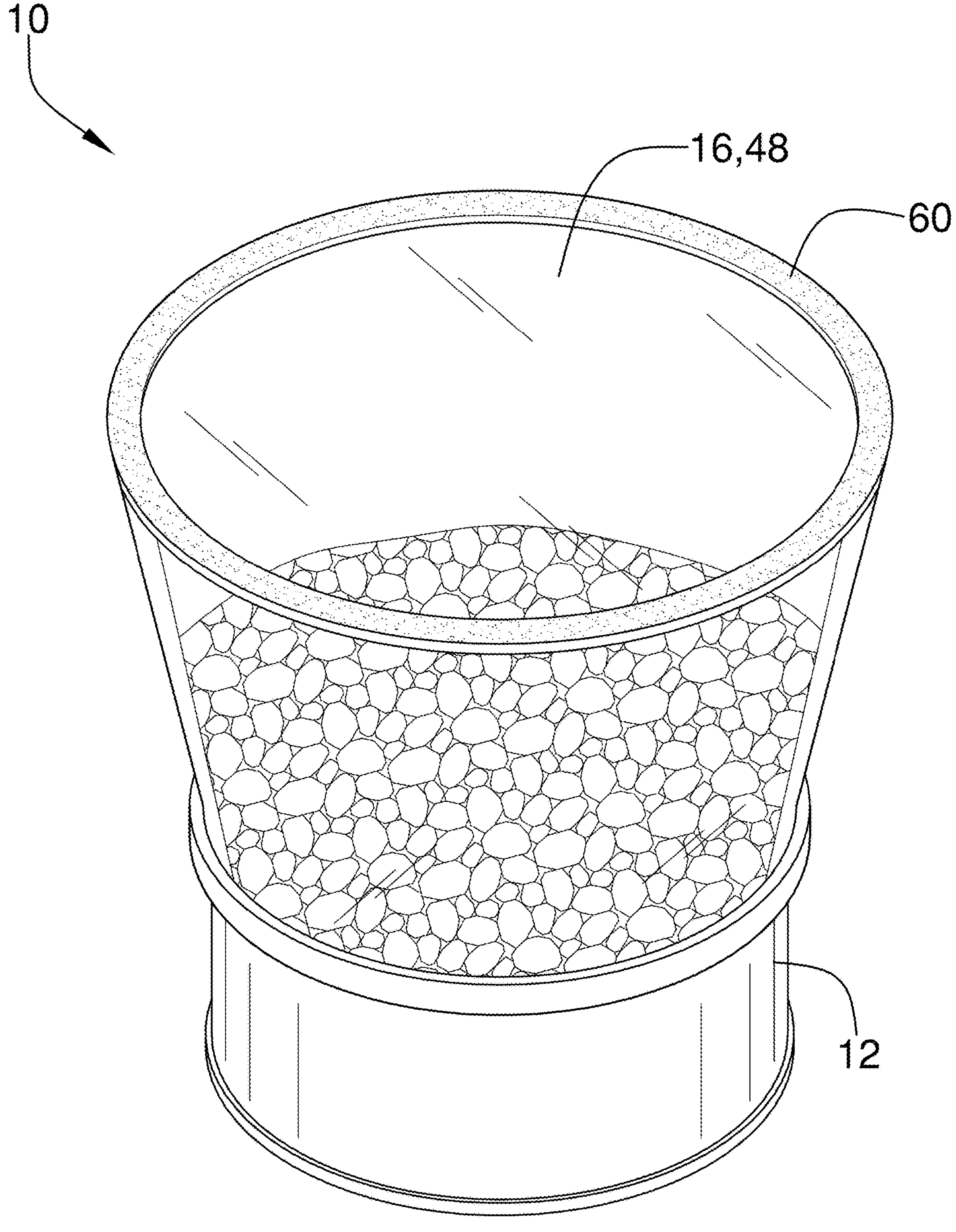
FIG. 8 is a perspective view of a first alternative embodiment of the disclosure.
Figure 9:
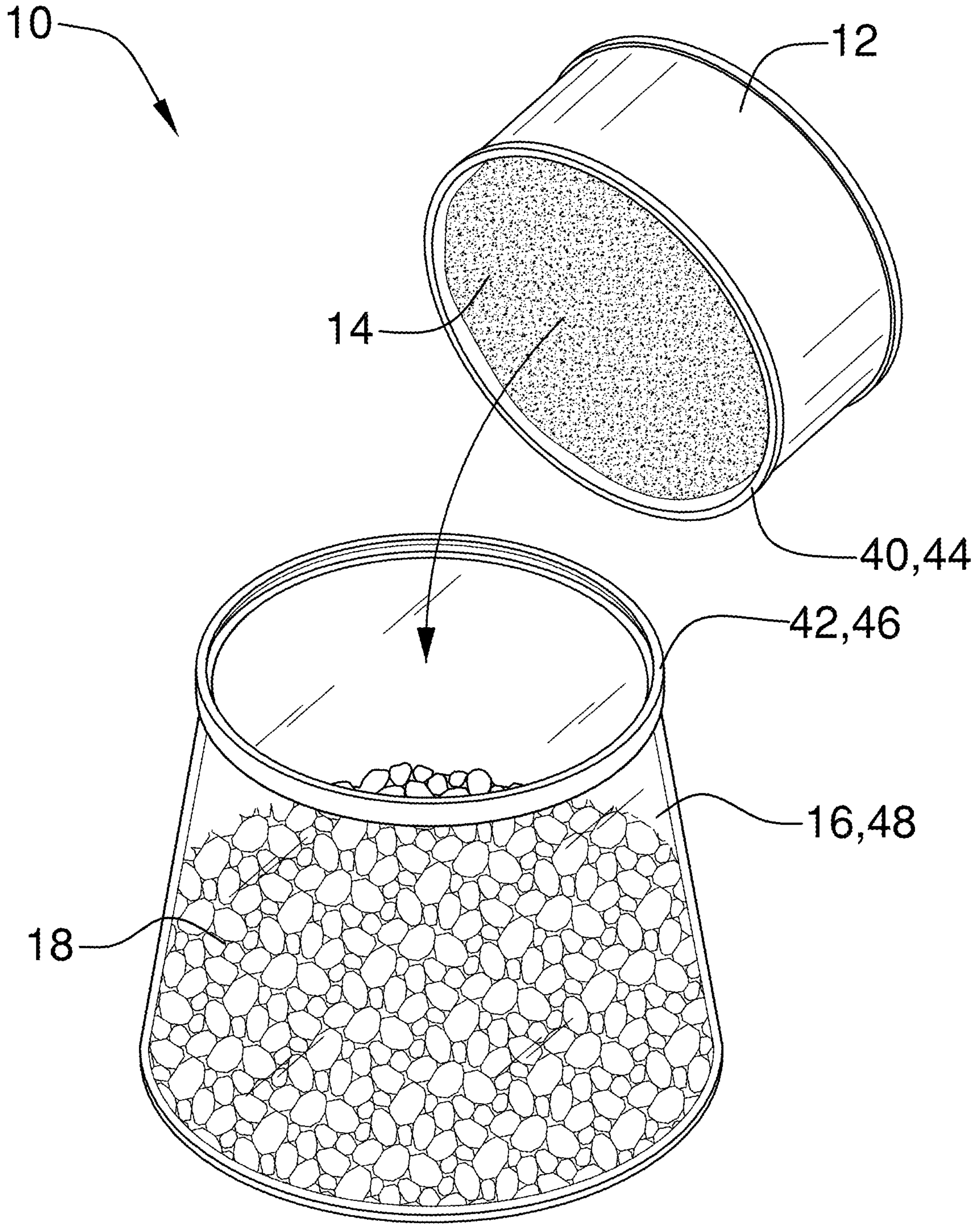
FIG. 9 is a perspective view of the first alternative embodiment of the disclosure in use.

FIGS. 8 and 9 show a first alternative embodiment of the disposable pet food pack 10, wherein the second container 16 is sufficiently large to contain both the single serving of dry pet food 18 and the single serving of wet pet food 14 mixed together to permit use of the second container 16 as a disposable pet food bowl 48. Instead of using a separate pet food bowl 70 as in FIG. 6, the pet owner can simply use the second container 16 as a disposable pet food bowl 48. There is enough space in the second container 16 to contain the mixture of wet food and dry food, as shown in FIG. 9. Consequently, the pet owner does not need to clean out the pet food bowl, thereby simplifying the feeding process and enhancing hygienic conditions in the home. FIG. 8 shows one possible design of the second container 16, wherein the second bottom 30 is larger than the second cover 34 to provide a stabilizing force when the pet 72 is eating out of the second container 16, much like a traditional pet food dish. A frictional element 60, such as a rubber ring, could be included for additional resistance against movement while the pet is eating. Other designs of the second container 16 that mimic other types of pet food bowls and dishes are within the scope of the disclosure.

Figure 10:
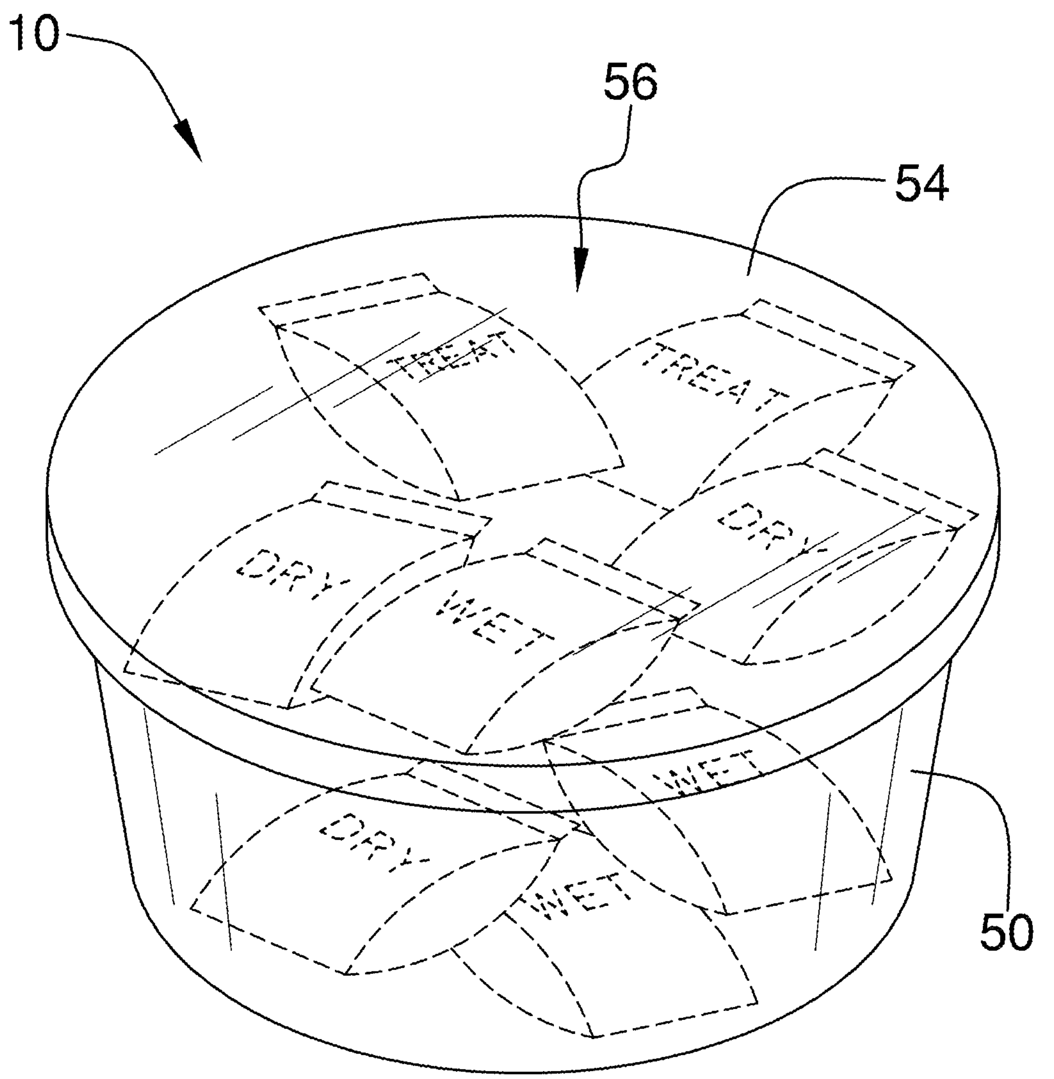
FIG. 10 is a perspective view of a second alternative embodiment of the disclosure.
Figure 11:
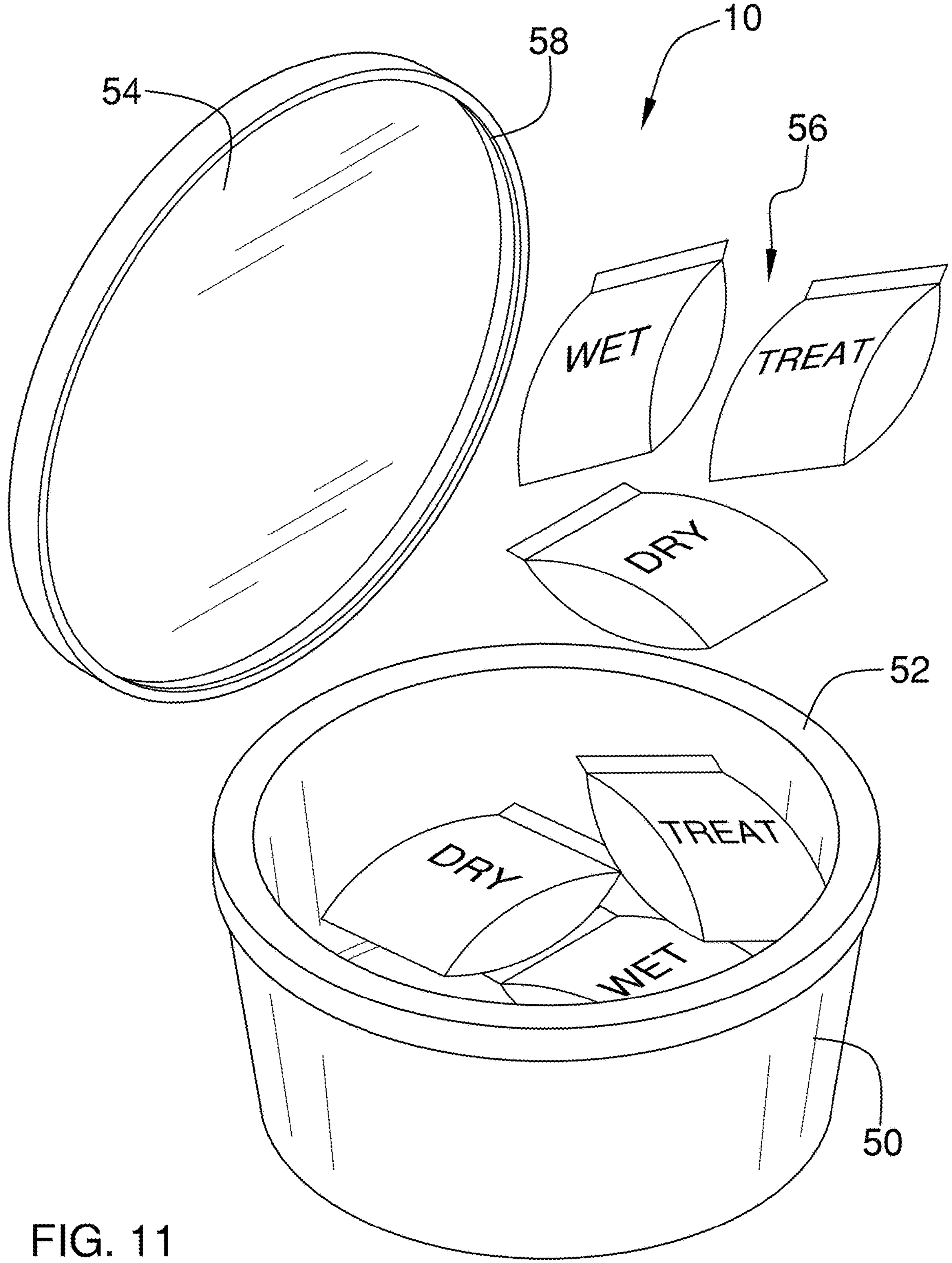
FIG. 11 is a perspective view of the second alternative embodiment of the disclosure in use.

FIGS. 10 and 11 show a second alternative embodiment of a disposable pet food pack 10. This disposable pet food pack 10 is for portable use by persons who spend time outside of the home of the pet, such as those who work in police, military, forestry, or similar outdoor industries, or such as those who engage in recreational activities outdoors. The disposable pet food pack 10 in this case includes a pet food bowl 50 that includes a lip 52, a cover 54 detachably connected to the lip 52, and single-serving pet food packets 56 stored in the pet food bowl 50 under the cover 54 and that include a wet pet food packet and a dry pet food packet. The single-serving pet food packets 56 could also include a pet treat packet. In the exemplary embodiment shown, the single-serving pet food packets 56 comprise a plurality of the wet pet food packets and a plurality of the dry pet food packets in equal numbers, though it is possible to only include one of each. There are also an equal number of pet treat packets, though this would be optional. The pet food bowl 50 is plastic, though it could be made of any material, such as metal. In one embodiment, the pet food bowl 50 is disposable after usage of all of the serving pet food packets 56. The cover 54 is a plastic lid that includes a ring 58 designed to fit onto and around the lip 52, though the cover 54 could be made of other materials, such as metal, and could connect to the pet food bowl 50 in most any manner. In use, the user removes the cover 54 and then removes all of the single-serving pet food packets 56. The user then opens one of the wet pet food 14 packets and one of the dry pet food 18 packets and mixes the wet food and the dry food in the pet food bowl 50, and then permits a pet to eat from the pet food bowl 50. The user then cleans the pet food bowl 50 after the pet has finished eating, places the unused ones of the single-serving pet food packets 56 into the pet food bowl 50, and recloses the pet food bowl 50 with the cover 54. The user can then repeat these steps until all single-serving pet food packets 56 are used before finally disposing of the pet food bowl 50. If one or more pet treats are included, they can be served as well to the pet. In this manner, the pet owner or service animal handler has a compact and disposable system to provide regular meals to his pet or service animal when outdoors or otherwise away from home.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A disposable pet food pack comprising:

a first container being sealed and containing a single serving of wet pet food;

a second container being sealed and containing a single serving of dry pet food;

a connection assembly detachably connecting said first container and said second container;

wherein said first container comprises a can and said first cover comprises a removable lid;

wherein said second container comprises a plastic tub having a planar bottom wall and a peripheral wall extending upwardly and angled outwardly from said planar bottom wall, said second cover comprising a peel-off layer, said second container being sufficiently large to contain both said single serving of dry pet food and said single serving of wet pet food mixed together to permit use of said second container as a disposable pet food bowl.

2. The disposable pet food pack of claim 1, wherein:

said first container comprises a first bottom, a first side wall extending from and transverse to said first bottom, and a first cover detachably connected to said first side wall;

said second container comprises a second bottom, a second side wall extending from and transverse to said second bottom, and a second cover detachably connected to said second side wall; and said connection assembly comprises a first connecting portion and a second connecting portion, wherein said first connecting portion comprises a lip disposed on said first side wall and said second connecting portion comprises a ring projecting from said second side wall, wherein said ring engages said lip in a snap-fit manner.

3. The disposable pet food pack of claim 1, wherein said lip is disposed about said first cover and said ring is disposed about said second cover such that said first cover faces said second cover when said first container is detachably connected to said second cover.

4. The disposable pet food pack of claim 1, wherein said first container comprises a can and said first cover comprises a removable lid.

5. The disposable pet food pack of claim 1, wherein said second container comprises a plastic tub and said second cover comprises a peel-off layer.

6. The disposable pet food pack of claim 2, wherein said lip is disposed about said first cover and said ring is disposed about said second cover such that said first cover faces said second cover when said first container is detachably connected to said second cover.

7. The disposable pet food pack of claim 1, wherein said second container is sufficiently large to contain both said single serving of dry pet food and said single serving of wet pet food mixed together to permit use of said second container as a disposable pet food bowl.

* * * * *